(12) United States Patent
Uhrmann et al.

(10) Patent No.: US 9,342,895 B2
(45) Date of Patent: May 17, 2016

(54) DEVICE AND METHOD FOR DETECTING A PLANT AGAINST A BACKGROUND USING PHOTOGRAPHS WITH DIFFERENT LEVELS OF BRIGHTNESS

(71) Applicant: Fraunhofer-Gesellschaft zur Foerderung der angewandten Forschung e.V., Munich (DE)

(72) Inventors: Franz Uhrmann, Erlangen (DE); Lars Seifert, Neumarkt (DE); Oliver Scholz, Moehrendorf (DE); Guenther Kostka, Erlangen (DE)

(73) Assignee: FRAUNHOFER-GESELLSCHAFT ZUR FOERDERUNG DER ANGEWAN, Muncih (DE)

( * ) Notice: Subject to any disclaimer, the term of this patent is extended or adjusted under 35 U.S.C. 154(b) by 13 days.

(21) Appl. No.: 14/337,347

(22) Filed: Jul. 22, 2014

(65) Prior Publication Data
US 2014/0334692 A1 Nov. 13, 2014

Related U.S. Application Data

(63) Continuation of application No. PCT/EP2013/050947, filed on Jan. 17, 2013.

(60) Provisional application No. 61/589,474, filed on Jan. 23, 2012.

(30) Foreign Application Priority Data

Jan. 23, 2012 (DE) .................. 10 2012 200 930

(51) Int. Cl.
*G06K 9/00* (2006.01)
*G06T 7/00* (2006.01)
(Continued)

(52) U.S. Cl.
CPC ............ *G06T 7/0097* (2013.01); *G06K 9/2027* (2013.01); *G06T 5/50* (2013.01);
(Continued)

(58) Field of Classification Search
None
See application file for complete search history.

(56) References Cited

U.S. PATENT DOCUMENTS 5,253,302 A * 10/1993 Massen .................... B07C 5/10
348/47
6,912,313 B2 6/2005 Li
(Continued)

OTHER PUBLICATIONS

Philipp, I. et al., "Improving Plant Discrimination in Image Processing by use of Different Colour Space Transformations", Computers and Electronics in Agriculture, vol. 35, Issue 1, Jul. 2002, pp. 1-15.
(Continued)

*Primary Examiner* — Tahmina Ansari
(74) *Attorney, Agent, or Firm* — Keating & Bennett, LLP

(57) ABSTRACT

A device for detecting a plant against a background includes a provider for providing a plurality of different photographs of the plant leaf against the background, the photographs differing in that image points of the different photographs relating to the same location of the plant leaf are illuminated with different levels of brightness, a selector for selecting such image points, from the different photographs, whose levels of brightness are within a predetermined range, an image point of a first photograph being selected for a first location of the plant leaf, and an image point of a second, different photograph being selected for a different location of the plant leaf to obtain a representation of the plant leaf against the background, the representation being composed of and/or merged from different photographs, and a segmenter for segmenting the composite photograph to obtain a segment representation having the plant leaf without the background or the background without the plant leaf.

15 Claims, 17 Drawing Sheets

(51) Int. Cl.
*G06T 5/50* (2006.01)
*H04N 1/60* (2006.01)
*G06K 9/20* (2006.01)

(52) U.S. Cl.
CPC ............... *G06T 7/0081* (2013.01); *H04N 1/60* (2013.01); *G06T 2207/10004* (2013.01); *G06T 2207/10024* (2013.01); *G06T 2207/20144* (2013.01); *G06T 2207/20208* (2013.01); *G06T 2207/20221* (2013.01); *G06T 2207/30188* (2013.01)

(56) References Cited

U.S. PATENT DOCUMENTS

| | | | | |
|---|---|---|---|---|
| 8,436,909 B2* | 5/2013 | Farina | ................... | H04N 9/045 348/218.1 |
| 8,437,498 B2* | 5/2013 | Malsam | ............... | A01G 25/092 239/71 |
| 2010/0322477 A1* | 12/2010 | Schmitt | .................. | G01S 17/00 382/103 |
| 2013/0028487 A1* | 1/2013 | Stager | .................... | B07C 5/342 382/110 |
| 2014/0334692 A1* | 11/2014 | Uhrmann | .............. | G06T 7/0081 382/110 |

OTHER PUBLICATIONS

Goshtasby, A., "Fusion of Multi-Exposure Images", Computer Science and Engineering, Wright State University, Jun. 1, 2005, pp. 1-13.

Teng, C. et al., "Leaf Segmentation, Its 3D Position Estimation and Leaf Classification from a Few Images with Very Close Viewpoints", Images Analysis and Recognition, Jul. 6, 2009, pp. 937-946.

Yee, Y. et al., "Segmentation and Adaptive Assimilation for Detail-Preserving Display of High-Dynamic Range Images", The Visual Computer, vol. 19, No. 7-8, Dec. 1, 2003, pp. 457-466.

Neto, J. et al, "Individual Leaf Extractions from Young Canopy Images Using Gustafson-Kessel Clustering and a Genetic Algorithm", Computers and Electronics in Agriculture, vol. 51, No. 1-2, Apr. 1, 2006, pp. 66-85.

Bablok, B. "HDR Für Faule; HDR Workflow Ohne Stativ und Mausklicks", Medialinx AG, LinuxUser, Sep. 2010.

Official Communication issued in corresponding German Application 10 2012 200 930.2, mailed on Nov. 14, 2012.

Official Communication issued in corresponding International Application PCT/EP2013/050947, mailed on May 3, 2013.

Official Communication issued in corresponding Canadian Patent Application No. 2,862,331, mailed on Nov. 24, 2015.

* cited by examiner dynamic range
from 1 to 20

1st image, medium exposure

FIGURE 2A dynamic range
from 10 to 20 with regard to
image 1, the
brightness levels
are higher by "9"

Values in grid (row, col):
- G$^{19}$, G$^{20}$
- G$^{11}$, G$^{20}$, G$^{20}$
- G$^{10}$, G$^{12}$, G$^{20}$, G$^{20}$
- G$^{14}$, G$^{20}$, G$^{20}$ 2$^{nd}$ image, high exposure

FIGURE 2B dynamic range from 1 to 11 with regard to image 1, the brightness levels are lower by "9"

|   |   |   |   |   |   |   |   |
|---|---|---|---|---|---|---|---|
|   |   |   |   |   |   |   |   |
|   |   |   |   | $G^1$ | $G^{10}$ |   |   |
|   |   |   | $G^1$ | $G^2$ | $G^{11}$ |   |   |
|   |   | $G^1$ | $G^1$ | $G^4$ | $G^{10}$ |   |   |
|   |   |   | $G^1$ | $G^3$ | $G^9$ |   |   |
|   |   |   |   |   |   |   |   |
|   |   |   |   |   |   |   |   |
|   |   |   |   |   |   |   |   |

3rd image, low exposure

FIGURE 2C

① : from the 1st image
② : from the 2nd image
③ : from the 3rd image composite image selection range: average brightness levels from 9 to 14 dynamic range from 9 to 14

|  |  |  |  |  |  |  |  |
|---|---|---|---|---|---|---|---|
|  |  |  |  |  |  |  |  |
|  |  |  |  | 13 | 14 |  |  |
|  |  |  | 20 | 21 | 22 |  |  |
|  |  | 27 | 28 | 29 | 30 |  |  |
|  |  |  | 36 | 37 | 38 |  |  |
|  |  |  |  |  |  |  |  |
|  |  |  |  |  |  |  |  |
|  |  |  |  |  |  |  |  |

FIGURE 3A

|  | image ① | image ② | image ③ | selection |
|---|---|---|---|---|
| 13 | 10 | 19 | 1 | ① |
| 14 | 19 | 20 | 10 | ③ |
| ⋮ | | | | |
| 20 | 2 | 11 | 1 | ② |
| 21 | 11 | 20 | 2 | ① |
| 22 | 20 | 20 | 11 | ③ |
| ⋮ | | | | |
| 27 | 1 | 10 | 1 | ② |
| 28 | 3 | 12 | 1 | ② |
| 29 | 13 | 20 | 4 | ① |
| 30 | 19 | 20 | 10 | ③ |
| ⋮ | | | | |

FIGURE 3B

DEVICE AND METHOD FOR DETECTING A PLANT AGAINST A BACKGROUND USING PHOTOGRAPHS WITH DIFFERENT LEVELS OF BRIGHTNESS

CROSS-REFERENCE TO RELATED APPLICATIONS

This application is a continuation of copending International Application No. PCT/EP2013/050947, filed Jan. 17, 2013, which is incorporated herein by reference in its entirety, and additionally claims priority from German Application No. 102012200930.2, filed Jan. 23, 2012, and from US Provisional Application No. 61/589,474, filed Jan. 23, 2012, which are also incorporated herein by reference in their entirety.

BACKGROUND OF THE INVENTION

The present invention relates to detection of plants and, in particular, to optical detection of plants which are planted in a field, in a greenhouse or on farmland, or which exist in any other way.

Detection of plants is important in agricultural engineering, so called phenotyping of plants having to be mentioned here. A further example of detection consists in identifying plants in order to enable, e.g., automatic pulling out of unwanted plants, i.e. weeds.

For three-dimensional detection of objects, various methods are commonly used, such as stripe-light methods or light section methods. Said methods offer high spatial three-dimensional resolution. However, with regard to illumination, they depend on defined ambient conditions. A further disadvantage is that three-dimensional detection cannot be effected within a very short time period.

With stripe-light methods, different light patterns must be successively projected onto the object, whereas with light section methods, only one contour line is detected at a given point in time. Thus, for three-dimensional detection, the object must be scanned.

In order to produce the defined light conditions on farmland and/or in a field, one may set up a tent which keeps the ambient light from the area to be detected. Subsequently, a defined ambient condition may be produced within said light-proof tent so as to employ the light section method or the stripe-light method. Once a specific area located within the tent has been dealt with, the tent must be taken down and be set up again at another location before the light section method and/or the stripe-light method may again be employed at said other location.

This approach is time-consuming and therefore expensive. In addition, it is not suited for three-dimensional detection of relatively large areas since this procedure is too slow. To achieve sufficient throughput, a large number of teams would have to work in parallel, which necessitates many tents, many light section cameras and, thus, also a large requirement in terms of trained specialists, all of which leads to an increase in cost.

On the other hand, particularly in the development of plant seeds it is very important to obtain an objective evaluation of the seedlings produced from a certain type of seed at regular intervals, such as every week to every two weeks, without said seedlings being destroyed. It shall be noted that as test fields, fields are to be employed which have a minimum size in order to have reasonably realistic growth conditions. Therefore, relatively large test areas will be necessitated if large cultivation areas for a type of seed are intended.

In addition to sizable test areas, accurate data on spatial orientation of plant leaves, on the size of the plant leaves, on the structure of the plant leaves, etc. are necessitated in order to obtain accurate information about a specific type of seed. In order to reliably obtain said information when the plants must not be pulled out, three-dimensional detection is necessitated since in the event of two-dimensional detection only projections and/or silhouettes of leaves are detected, their orientations cannot be determined, and their true surface areas also cannot be determined since one cannot draw any conclusions as to the area itself from a mere projection without knowledge of the orientation of the projected area.

Extraction of plant features from measurement data of imaging methods is necessitated, therefore, in various applications of modern agricultural engineering and agriculture sciences. In this context it is necessitated to identify the plant in the captured data and to distinguish between image regions which are part of the plant and image regions which are not part of the plant. For segmentation, color pictures of a plant are typically used for segmentation since in said color pictures, the green plant may be clearly distinguished from, e.g. brown soil.

A standard method of separating plant and background areas with the aid of preliminary data is described in the specialist publication "Improving Plant Discrimination in image processing by use of different colour space transformation", I. Philipp, T. Rath, Computers and Electronics in Agriculture 35 (2002) 1-15 (Elsevier).

Here, the RGB color channels of each individual pixel are suitably transformed, and subsequently, a decision is made by means of a decision criterion as to whether the pixel is classified as a plant image point or non-plant image point (background). For example, the proportion of the green channel in the overall color may be determined for each pixel and may be classified as a plant pixel if said proportion exceeds a threshold value.

What is problematic in said methods is the small amount of information of a color picture. There are only three values available for each image point: the levels of brightness of the green channel, of the red channel and of the blue channel. However, especially in the detection of plants, there may be large differences in brightness, for example. Reasons for this are, e.g., different angles of the plant leaves in relation to the light source and shadows cast by parts of plants. In addition, the levels of brightness within a leaf or between several leaves are not mutually homogenous. Leaves frequently have a light primary vein or lighter stalks.

Due to the large variability that is possible and to the limited dynamics of color cameras it happens that light plant regions are overexposed, and that dark plant regions are underexposed. For example, light leaf stalks are overexposed, whereas some regions at the leaf edges are too dark for reliable segmentation due to their downward curvature.

SUMMARY

According to an embodiment, a device for detecting a plant against a background may have: a means for providing a plurality of different photographs of the plant leaf against the background, the photographs differing in that image points of the different photographs which relate to the same location of the plant leaf have different levels of brightness; a means for selecting such image points, from the different photographs, whose levels of brightness are within a predetermined range, an image point of a first photograph being selected for a first location of the plant leaf, and an image point of a second, different photograph being selected for a different location of the plant leaf so as to obtain a representation of the plant leaf against the background, said representation being composed of and/or merged from different photographs; and a means for segmenting the composite photograph so as to obtain a segment representation having the plant leaf without the background or the background without the plant leaf.

According to another embodiment, a method of detecting a plant against a background may have the steps of: providing a plurality of different photographs of the plant leaf against the background, the photographs differing in that image points of the different photographs which relate to the same location of the plant leaf have different levels of brightness; selecting such image points, from the different photographs, whose levels of brightness are within a predetermined range, an image point of a first photograph being selected for a first location of the plant leaf, and an image point of a second, different photograph being selected for a different location of the plant leaf so as to obtain a representation of the plant leaf against the background, said representation being composed of and/or merged from different photographs; and segmenting the composite photograph so as to obtain a segment representation having the plant leaf without the background or the background without the plant leaf.

Another embodiment may have a computer program having a program code for performing the above method of detecting a plant leaf, when the computer program runs on a computer or a processor.

The present invention is based on the finding that more stable and reliable segmentation of plants in color photographs may be achieved in that several photographs of the same plant, such as of a plant leaf or, generally, of part of a plant or of several plants, are created which have different levels of brightness so as to then perform a dynamic range compression (volume compression). In this manner, overexposed portions of a photograph are replaced by the same portions of a different photograph having a lower level of exposure. The photograph having the lower level of exposure results in that the areas which are overexposed in the first photograph are normally exposed. On the other hand, normally exposed areas of the first photograph are probably underexposed in the underexposed second photograph, which is uncritical, however, since the normally exposed areas of the first photograph for the corresponding image area may be used for the corresponding image area. Likewise, areas which are underexposed in the first photograph may be taken from a further photograph which is highly exposed. This high level of exposure results in that those areas which are actually underexposed in the first photograph are normally exposed, whereas, obviously, areas of the first photograph which are already overexposed there, are even more overexposed. However, this is uncritical since the overexposed areas of the first photograph need not be used, but use may be made instead of the corresponding areas of the second photograph, which has been exposed to a lesser degree than the first photograph.

In accordance with the invention, a composite representation of the plant leaf is thus produced which has a clearly lower dynamic than may be found in the original photographs. If the composite representation was visually displayed, e.g. on a monitor or on a photo, it would have no particularly high quality. On the other hand, due to the dynamic range compression performed, said composite representation is particularly well suited for subsequent segmentation since overexposure and/or underexposure issues have been eliminated there.

BRIEF DESCRIPTION OF THE DRAWINGS

Embodiments of the present invention will be explained in detail below with reference to the accompanying figures, wherein:

FIG. 2a shows a schematic representation of a first image of medium exposure;

FIG. 2b shows a schematic representation of a second image of high exposure;

FIG. 2c shows a schematic representation of a third image of low exposure;

FIG. 3a shows a schematic representation of the image with pixel numbering;

FIG. 3b shows a composite representation presented as a list;

DETAILED DESCRIPTION OF THE INVENTION

Figure 1:
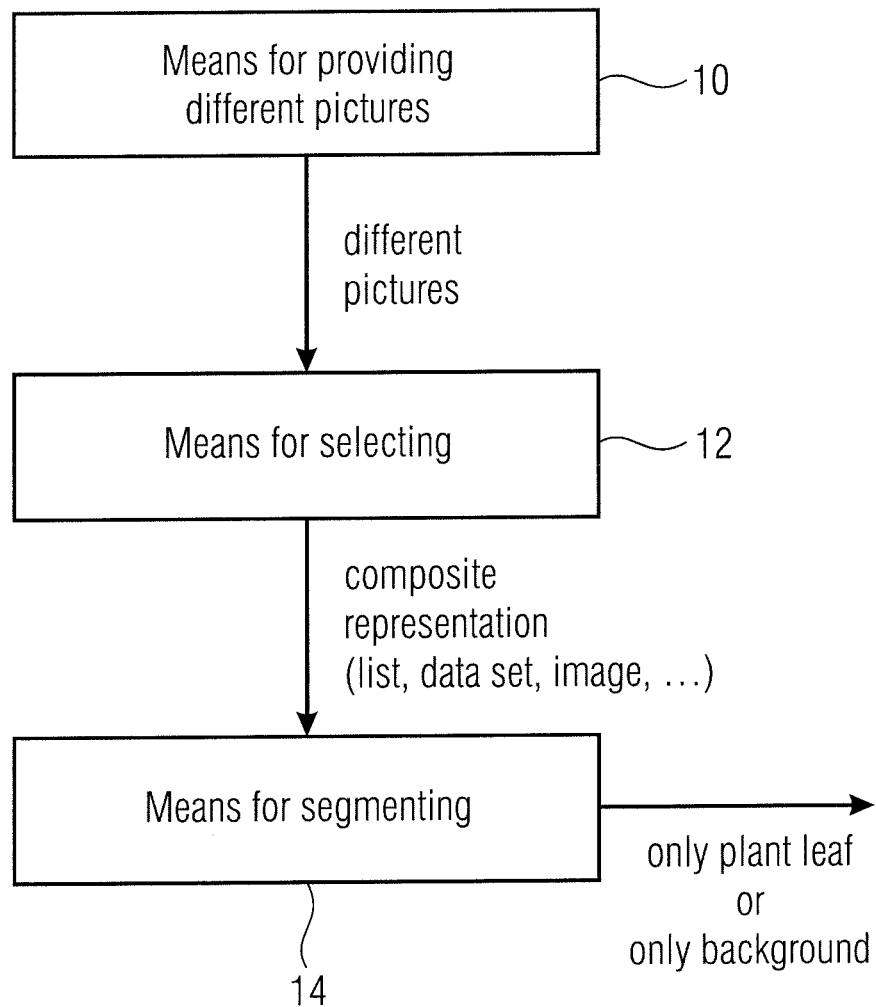
FIG. 1 shows a block diagram of an inventive device for detecting a plant leaf and/or a representation of a method of detecting a plant leaf.

FIG. 1 shows a device for detecting a plant leaf against a background. The device includes a means 10 for providing a plurality of different photographs of the plant leaf against the background, the photographs differing in that image points of the different photographs which relate to the same location of the plant leaf are illuminated with different levels of brightness.

The means 10 for providing is coupled to a means 12 for selecting image points from the different photographs, the levels of brightness of the different photographs being within a predetermined range. In particular, the means for selecting is configured such that for a first location of the plant leaf, an image point of a photograph is selected, and for a different location of the plant leaf, an image point of a second, different photograph is selected so as obtain a composite representation of the plant leaf against the background composed of different photographs. The means 12 for selecting is coupled to a means 14 for segmenting the composite photograph so as to obtain a segment representation comprising only the plant leaf without the background or the background without the plant leaf.

The means 10 for providing different photographs is configured, for example, as a color camera which photographs the same plant leaf against the background with different exposure times so as to produce the different photographs. Therefore, a series of photographs are taken for each image point instead of one single photograph of the image, the individual image points being illuminated differently. Depending of the implementation, this may be achieved in various manners. For example, the exposure time, the illumination intensity, the illumination direction or the camera sensitivity may be varied. Depending on the implementation, the positions of the color camera and the plant leaf are kept stationary, for example, so that in the individual photographs, a perfect match of the individual pixels results. Alternatively, in between the various photographs, the relative location of the illumination, of the plant or of the camera may also be changed. However, in this case it will then be necessitated for corresponding image points to be associated with one another. This may be achieved, e.g., in that position sensors are employed, e.g. within the camera. Such position sensors are position generators or acceleration sensors, for example. Alternatively, one may also operate without any acceleration sensors. In this case, the means 10 for providing is configured to extract common features from the different photographs and to create, on account of the change in such a common feature from one photograph to the next, a motion vector describing the relative motion between the camera and the plant leaf. Said motion vector may be a two-dimensional vector if the distance from the plant leaf has not changed. However, if the plant leaf and the camera should change in terms of their mutual distance, the motion vector will be a three-dimensional vector. The third dimension, i.e. the distance between the camera and the plant leaf, may also be determined from the images on the basis of common extracted features. For example, if the common feature of a second photograph is smaller than the corresponding feature in the first photograph, the distance between the camera and the plant leaf was larger in the second photograph. The distance will then be calculated on the basis of the ratio of the sizes of the common features in the different photographs.

A commercially available camera typically has a depth of color, or a dynamic range, of 8 bits. This corresponds to 256 gradations of colors, or levels of brightness, per color channel. This entire dynamic range may be split up into a number N of different dynamic subranges. If, for example, a subdivision of the entire maximum dynamic range into five subranges is performed, each subrange will have a set of 51 gradations of colors, or levels of brightness, per color channel. In this case, a total of five photographs of the plant leaf would be taken, the exposure levels being adjusted for each photograph in such a manner that the dynamic range falls in the corresponding subrange. Depending on the implementation, subdivision into more dynamic subranges is performed, which directly results in more individual photographs. Alternatively, it is also possible to take fewer photographs, such as only three photographs for example, in which case the exposure is adjusted such that there are predominantly exposed pixels in three different dynamic ranges. For example, with subdivision into three dynamic ranges, each dynamic range would have about 85 gradations of brightness and/or color per color channel.

The means 12 for selecting is configured, depending on the implementation, such that from the photographs made, a number of levels of image brightness is composed for corresponding points while taking into account the picture-taking parameters, in particular the positions of the camera and of the object. Thus, the means 12 for selecting uses the results of the means 10 for providing, and in particular a two-dimensional or three-dimensional motion vector with a permitted relative motion between the camera and the leaf. However, if there is no relative motion between the camera and the leaf, this will result in that the different photographs will reproduce the same portion of the plant leaf against the background, and that, therefore, the individual pixels will perfectly match one another. A pixel having a specific coordinate within a photograph thus reproduces the same location of the plant leaf as does the pixel having the same coordinate in a different photograph.

Different implementations of the means 12 for selecting will be represented below by means of FIGS. 2a to 3b.

Figure 2D:
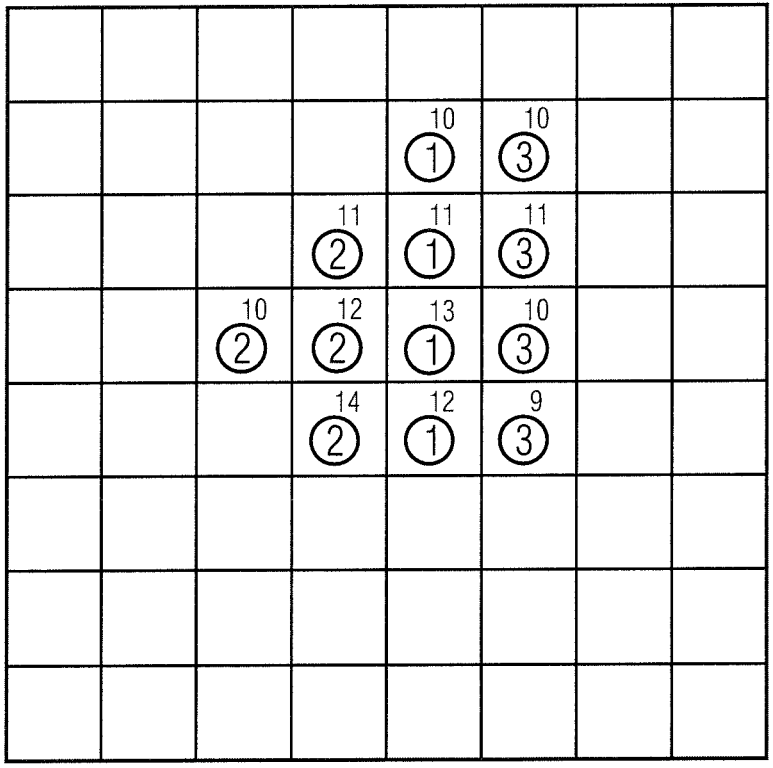
FIG. 2d shows a schematic representation comprising the composite representation.

FIG. 2a shows a schematic representation of a first image, or of a first photograph, which has been subjected to medium exposure. The "G" in the individual pixels—an image 8×8=64 pixels being shown by way of example—depicts the brightness of the green channel. One may see, for example, that the levels of brightness of the green channel vary between 1 (on the left in FIG. 2a) and 20 (on the right in FIG. 2a), a maximum dynamic range of 1 to 20 being assumed for this example. Medium exposure has been determined, for example, by a digital camera having automatic exposure control—however, one may see that the left-hand area of the plant leaf is underexposed, whereas the right-hand area of the plant leaf is overexposed. Merely for clarity's sake, the other pixels, which have not been specifically designated in FIG. 2a, have been left blank. Of course, they, too, contain information in the three color channels. Additionally, FIG. 2a shows those pixels of the leaf which have already been considered as the result of the segmentation, which adopts an approximately triangular shape in FIG. 2a. Naturally, however, segmentation is not yet known at the time the photograph of FIG. 2a is taken, but will then be calculated on the basis of the composite representation as is shown in FIG. 2d, for example.

However, typical segmentation, if directly applied to the first image in FIG. 2a, will exhibit reduced reliability since the overexposed areas on the right in FIG. 2a and the underexposed areas on the left in FIG. 2a cannot be detected reliably.

FIG. 2b shows a further photograph, or a second image, of the plant leaf against the background, but now with high exposure. This results in that the highly exposed areas on right in FIG. 2b are becoming saturated due to the even higher exposure, and that all of them appear with the maximum brightness 20. The central areas are also recorded with the maximum or near-maximum brightness. The underexposed area on the left in FIG. 2b and FIG. 2a, respectively, are now normally exposed, however. For the example shown in FIG. 2b, the level of exposure was increased to such an extent that levels of brightness result which are higher by "nine" with regard to image 1.

FIG. 2c shows a further photograph of the plurality of photographs produced by the means 10 of FIG. 1. Here, a low level of exposure has been used, which results in that the areas on the left in FIG. 2c, which are already subjected to low exposure anyhow are at the lower saturation level, i.e. remain at the same low level of exposure. However, the photograph having low exposure results in that those areas which are overexposed in FIGS. 2a and 2b are now located within a medium dynamic range. With regard to image 1, in FIG. 2c the level of brightness was selected to be lower by a value of "9".

It shall be noted that typical color cameras have dynamic ranges of 256, as was already set forth above. Only by way of example, maximum dynamics of 20 were assumed in FIGS. 2a to 2c.

FIG. 2d now shows a composite, or merged, image which has formed once a selection range of brightness levels has been assumed which includes levels of brightness between 9 and 14. This shows that the central area has been selected from the first image of FIG. 2a, that the left-hand area has been selected from the second, highly exposed image of FIG. 2b, and that the right-hand area has been selected from the third, low-exposure image of FIG. 2d.

A medium range of 9 to 14 has been provided in the example shown in FIG. 2d for selecting the individual pixels from the different images. Alternatively, selection may also be effected such that one determines, for each pixel, the photograph wherein a pixel exists which is closest to half the maximum dynamic range, i.e. which is closest to 10. The result would lead to the same composite representation of FIG. 2d in the example depicted in FIGS. 2a to 2d. However, this implementation—i.e. the fact that for each pixel, that image is selected whose pixel is closest to the target value— ensures that a piece of information is automatically found for each pixel from any of the plurality of images.

The composite image shown in FIG. 2d may actually be produced in such a manner that it appears to be one single photograph. Visual representation of this composite image is also possible, however, it is of low quality for any viewer and is not nice to look at. The reason for this is that the image exhibits compressed dynamics which is only between 9 and 14, whereas all of the dynamic ranges of the underlying photographs are larger, the dynamic range of the first photograph, in particular, being the maximum dynamic range between 1 and 20. In order to perform segmentation, however, it is not required to produce the composite representation as a composite image. This merely depends on the form in which the segmentation algorithm performed in the means 14 for segmenting necessitates the input data to be. Alternatively, a list comprising references may also be produced as a composite representation, which is characterized in that there exists, for each pixel, a reference to one of the plurality of photographs.

Figure 3A:
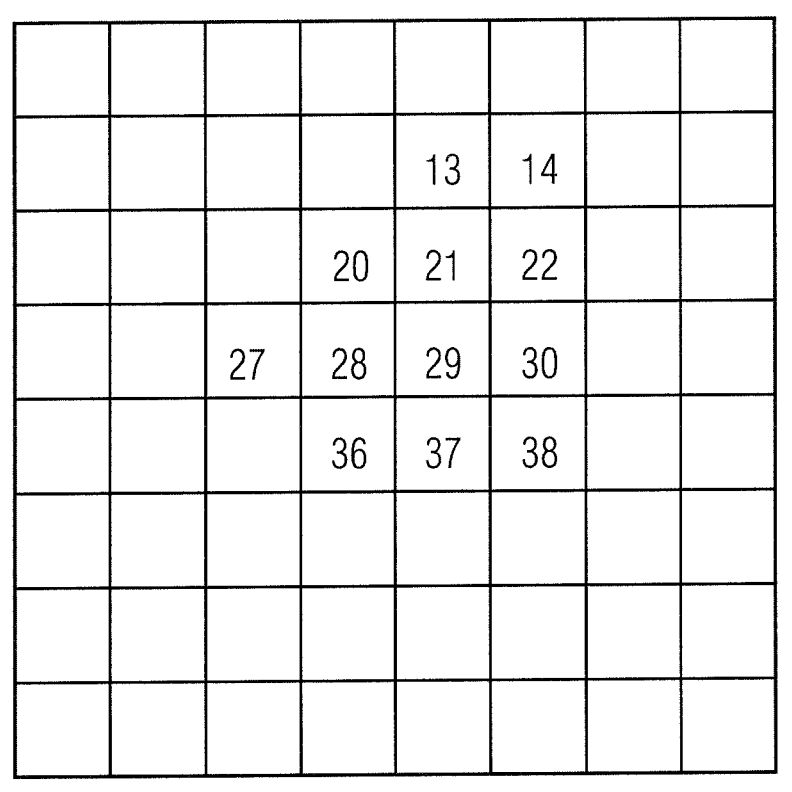

In this context, alternative generation of the composite representation will be given below with reference to FIGS. 3a and 3b. FIG. 3a, again, shows the image, however now with the pixel coordinates for the pixels discussed in FIGS. 2a to 2d. In addition, the table in FIG. 3b shows the brightness value of the corresponding image for each pixel coordinate, respectively. The last column of the table in FIG. 3b indicates the selection, a reference to image 1, image 2 or image 3 being now associated with each pixel. The composite representation would thus be a list of the pixel coordinates 1 to 64 and, associated with each pixel coordinate, selection information as to which of the individual photographs the pixel having this coordinate is taken from so as to appear in the composite representation. If this list of FIG. 3b is transformed into one single composite pixel photograph and/or into a pixel array, what will result is precisely the representation in FIG. 2d.

The means 12 for selecting may further be implemented such that for each image point, a series of image brightness levels and/or brightness data are evaluated and used for segmentation. An algorithm would consist in that, for example, those values—from the obtained series—are used wherein the brightness of a color channel and/or the average brightness of all of the color channels is within the average dynamic range of the camera, if possible. In this manner, the occurrence of over- or underexposed pixels is avoided, and it is avoided that reliable segmentation cannot take place there. A color image, or a composite representation, thus generated may then be segmented by means of a standard algorithm, depending on the implementation. In addition, a more complex segmentation algorithm would take into account the curve of the brightness for all of the three color channels while considering the picture-taking situation, and would use this for segmentation.

Even though in FIGS. 2a to 3b, only the brightness values of green of the individual image points from the individual photographs have been considered, which here intuitively seems reasonable for detecting a green plant, one has found that better results in segmentation are achieved by not selecting the levels of brightness of one color channel and discarding the levels of brightness of the other color channels. Rather, it is of advantage to calculate, for each image point, an average brightness level on any color channels for said image point and to then perform selection in accordance with FIG. 2d or FIG. 3b on the basis of this average value.

Figure 4:
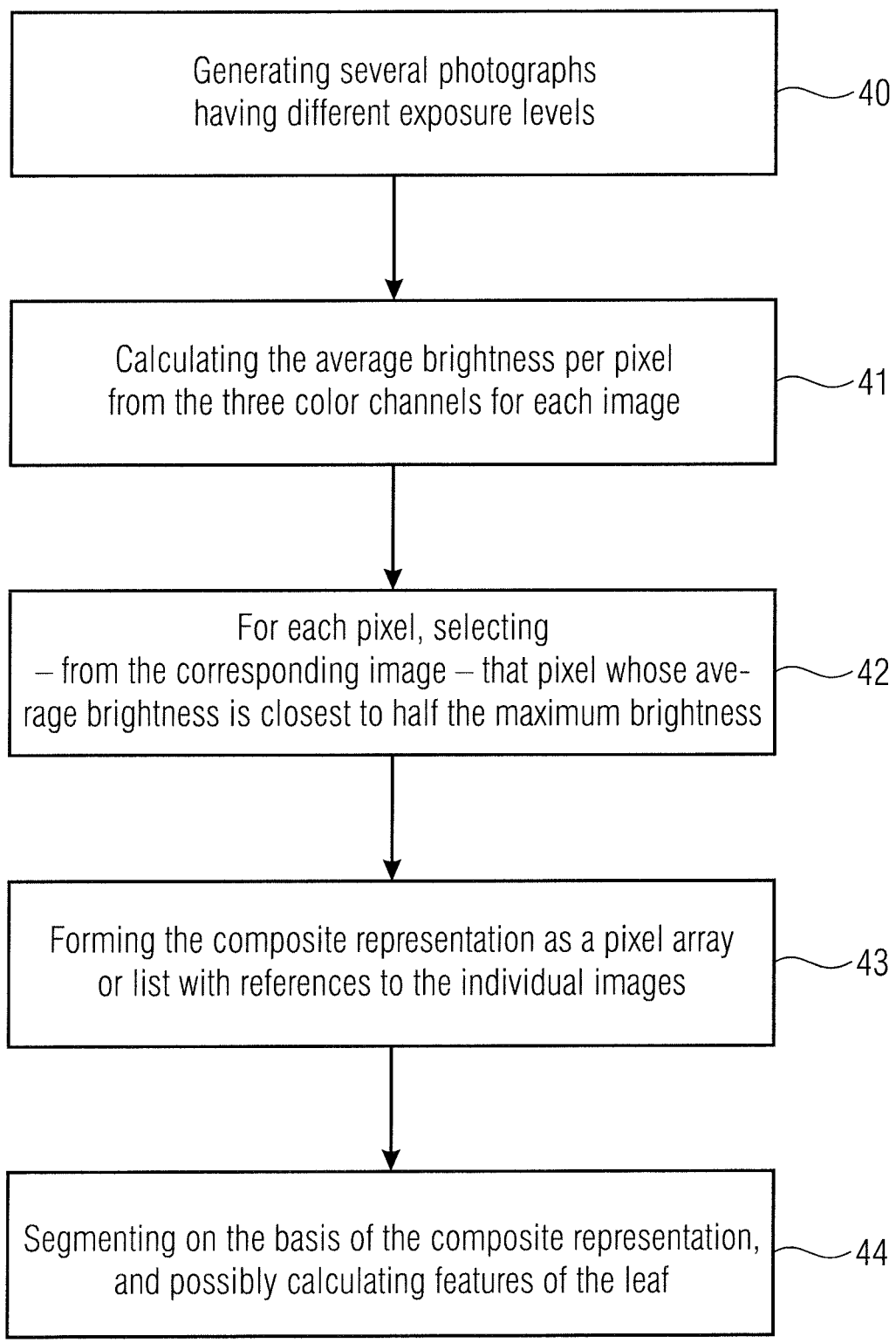
FIG. 4 shows a flowchart of a method of detecting a plant leaf.

An implementation of the method of detecting an image will be presented below with reference to FIG. 4. In a step 40, several photographs having different levels of exposure are generated by the means 10 for providing of FIG. 1. Said generation may be effected, for example, on the part of a commercially available digital color camera. Alternatively, it is also possible to read in any pictures—which have been previously taken—on the part of the means for providing different photographs. In a step 41, calculation of the average brightness is performed, by the means 12 for selecting, per pixel from the three color channels for each image, so that thus, a representation of each photograph is generated which only has an average brightness value per pixel. Subsequently, a selection is performed for each pixel in a step 42. In particular, that pixel whose average brightness level is closest to half the maximum brightness is selected from the corresponding image. If the maximum brightness is a value of 256, for example, half the maximum brightness would be 128. This average value is of advantage. However, one has found that similarly good results will be obtained if half the maximum brightness is varied by + or −50% of half the maximum brightness, i.e. if a value of 192 is used instead of 128, or if a value of 64 is used instead of 128.

On the basis of the result of step 42, a step 43 comprises generating a composite representation either as a pixel array in accordance with FIG. 2d or as a list of references to the individual images in accordance with FIG. 3b or in a different commonly used form. Subsequently, a step 44 comprises performing segmentation on the part of the means 14 of FIG. 1 on the basis of the composite representation, and possibly calculation of leaf features. Said leaf features relate to a number of leaves, to the sizes of the individual leaves, to surface areas and/or surface shapes and, also, to the orientation of the leaf and/or an angle of inclination of the leaf, e.g. in relation to the sun, to a different source of illumination or to a reference direction.

Segmentation in step 4 may be performed as is set forth in the document mentioned above. In particular, a discriminant analysis is performed which consists of two parts. Initially, color space transformation is performed, which is followed by binarization. Binarization relates to the difference between the plant and the soil and/or the background. No extra threshold formation is required for this purpose. By using specifically produced trainee data and the following discriminant function, which may be linear or logarithmic, the probability that each pixel of the test images belongs to a corresponding group (plant or background) is calculated. Subsequently, each pixel is allocated to a group on the basis of the calculated probability. In order to analyze an unknown data set while using discriminant analysis or canonical transformation, the trainee data set is necessitated. It defines the different groups and their characteristics. Therefore, different pictures are taken under different ambient conditions. For example, 20 plant regions and 20 background, or soil, regions may be manually marked on each image. For each region, the average gray intensity of each channel is calculated and stored as the trainee data set.

Figure 5A:
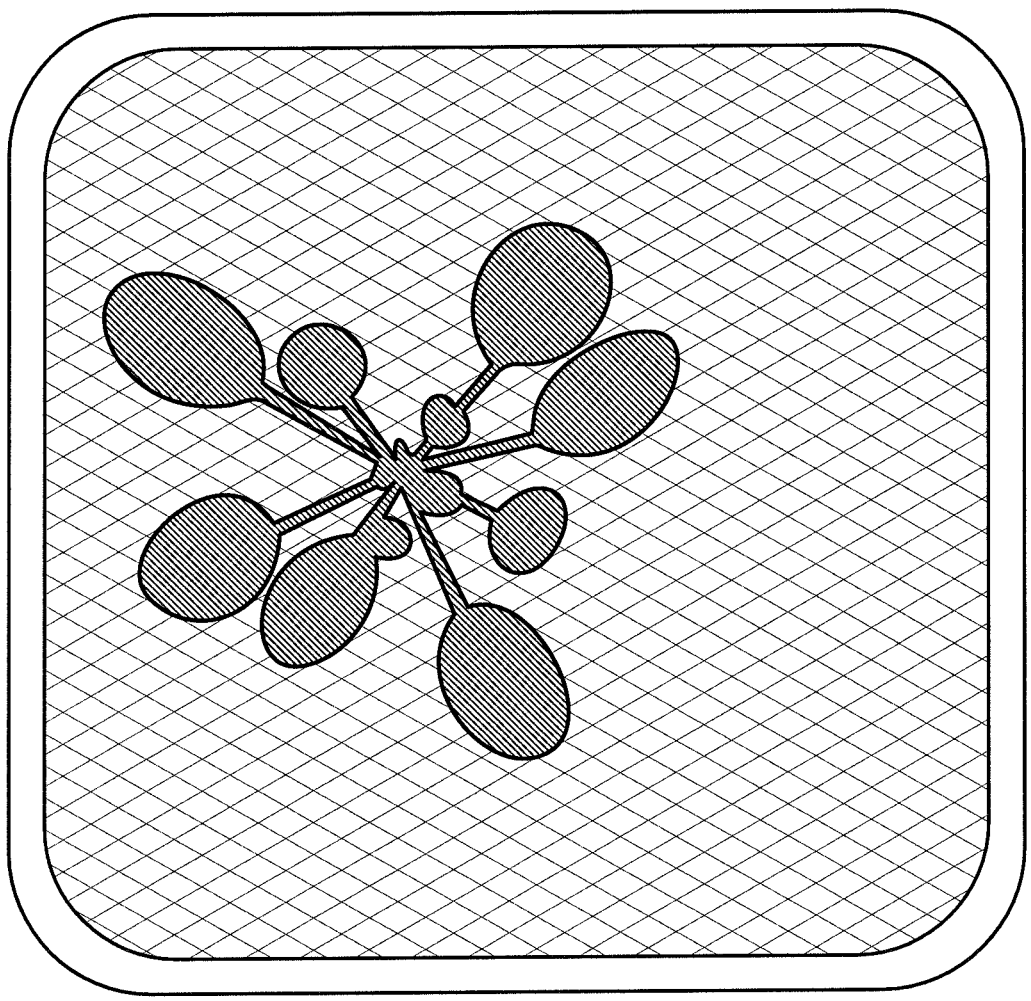
FIGS. 5a to 5g show different photographs with increasing exposure times of the same plant.
Figure 5B:
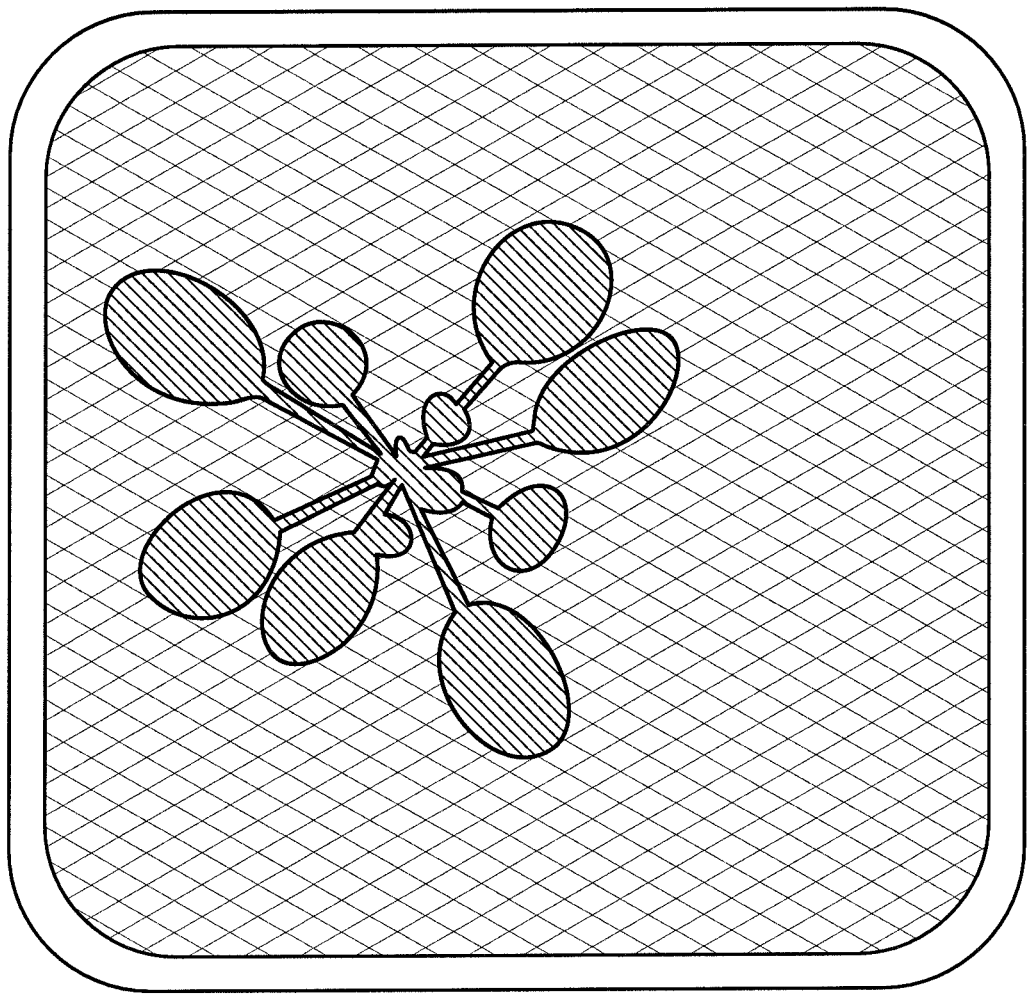
Figure 5C:
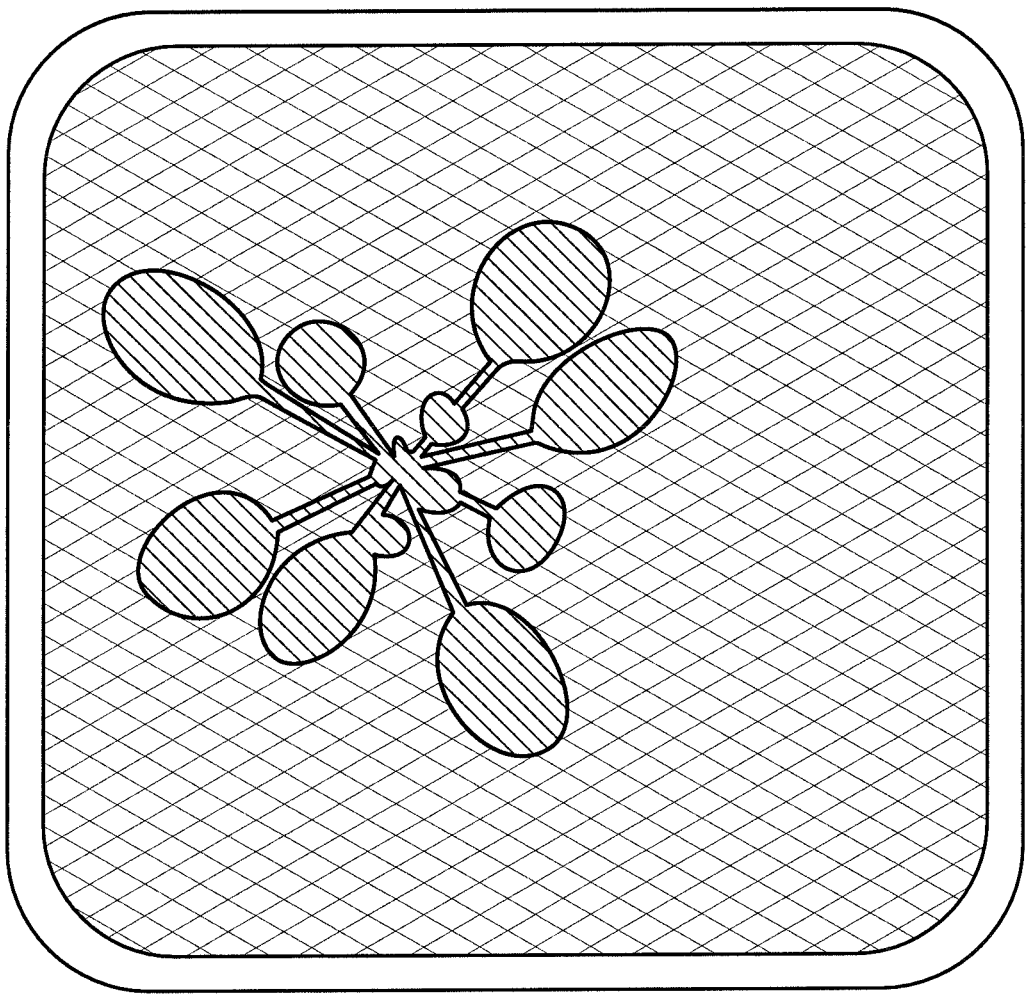
Figure 5D:
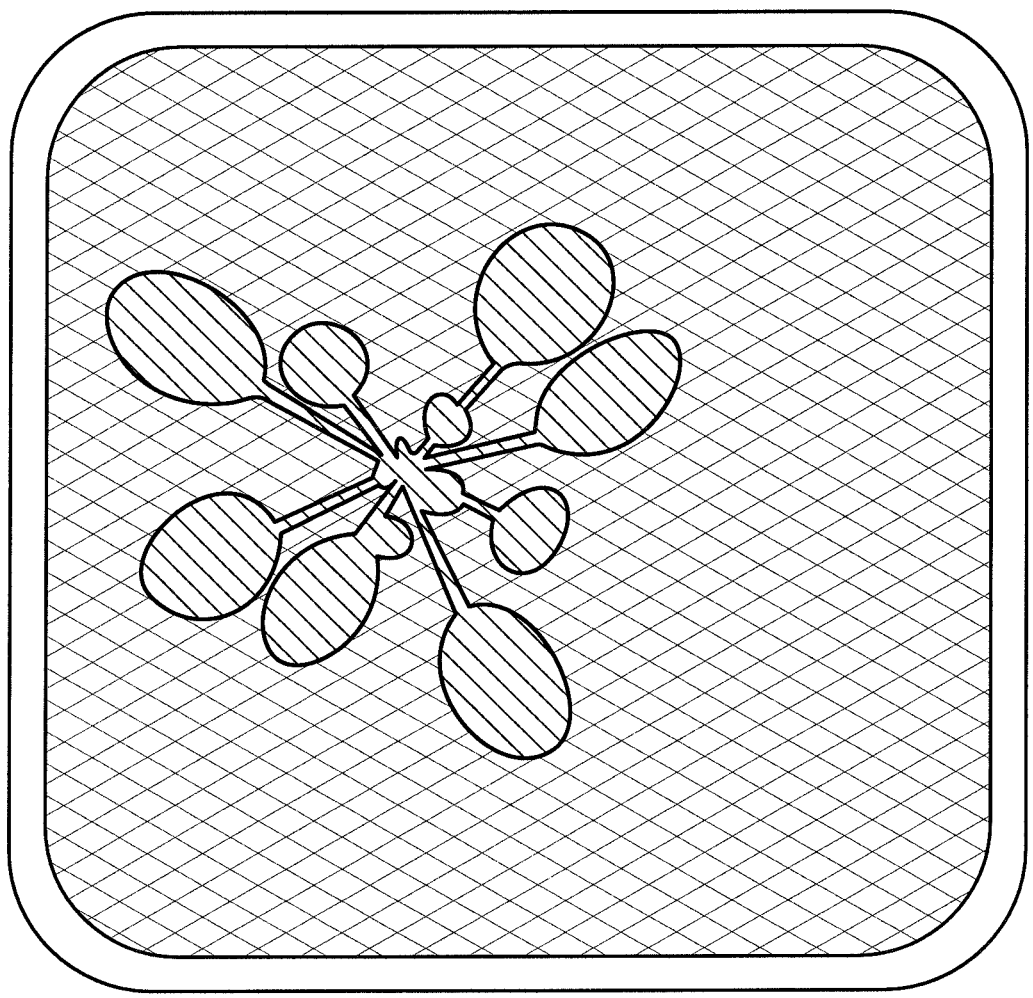
Figure 5E:
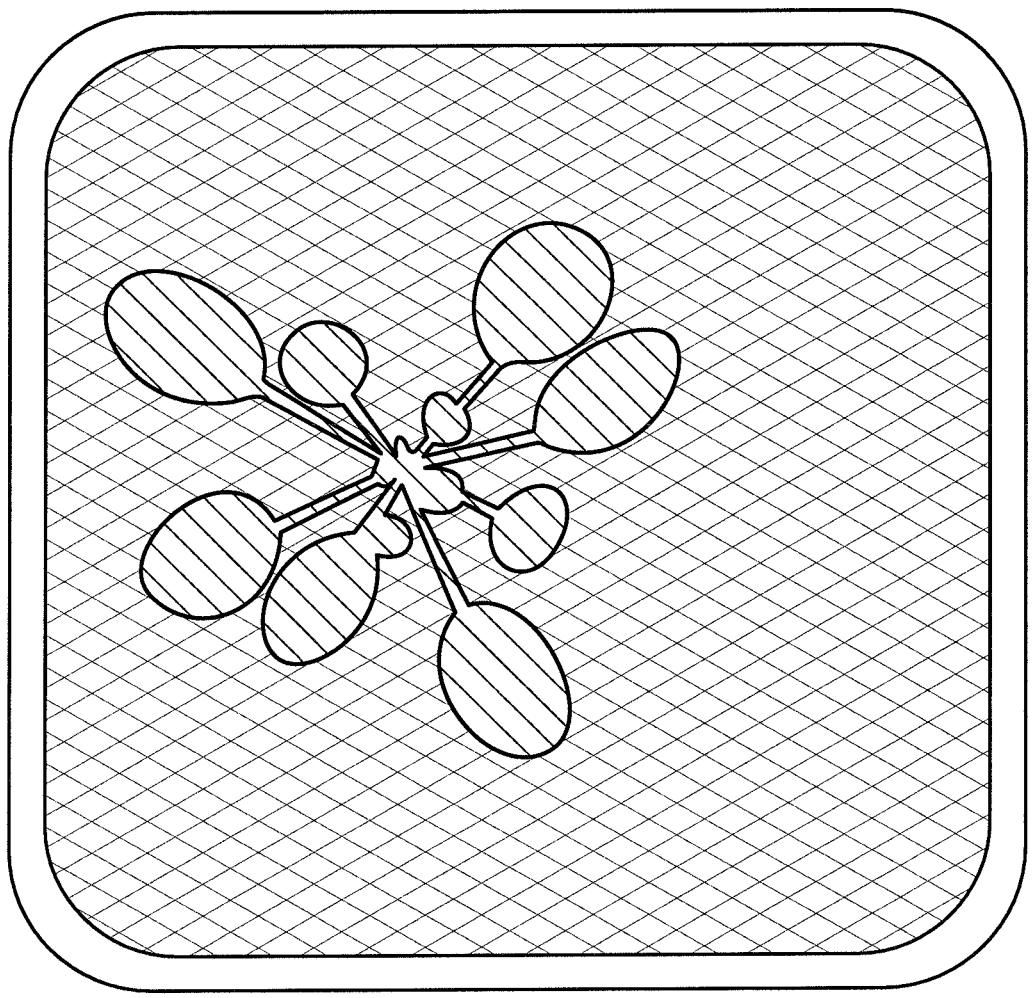
Figure 5F:
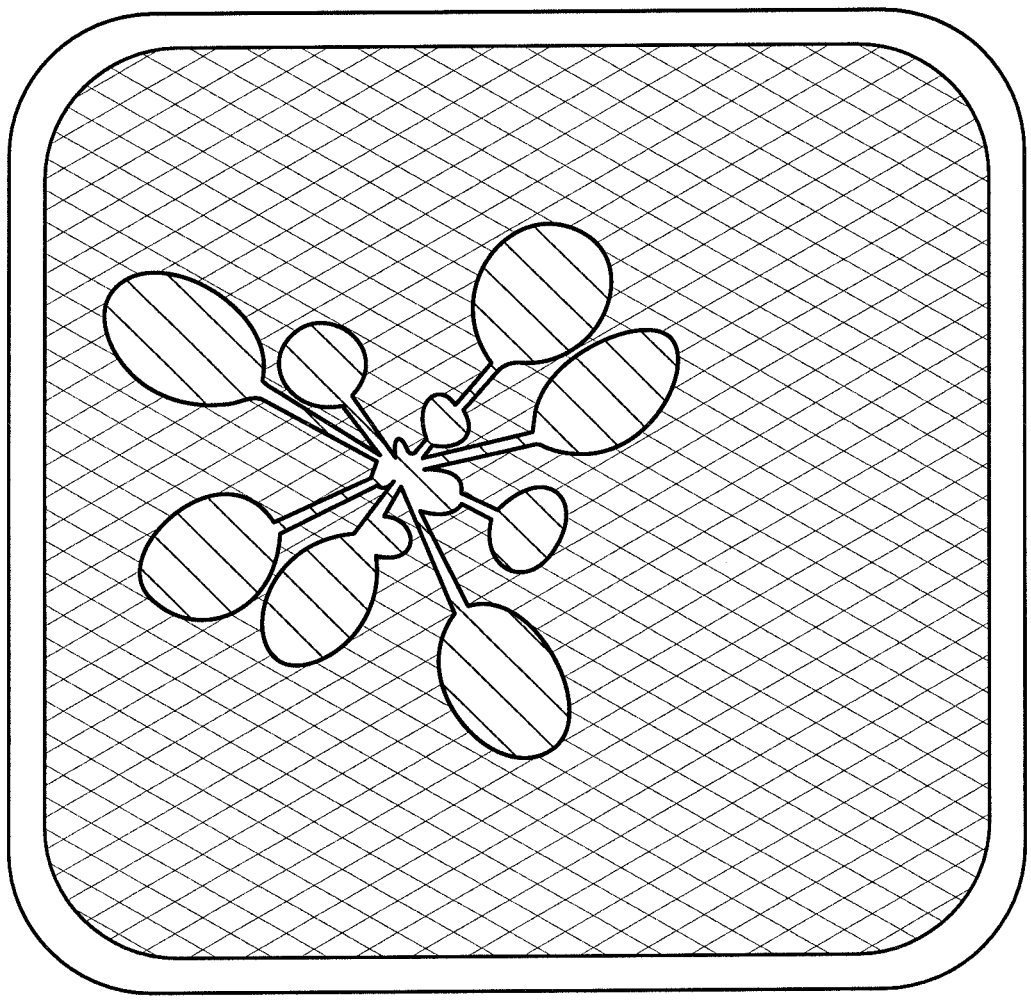
Figure 5G:
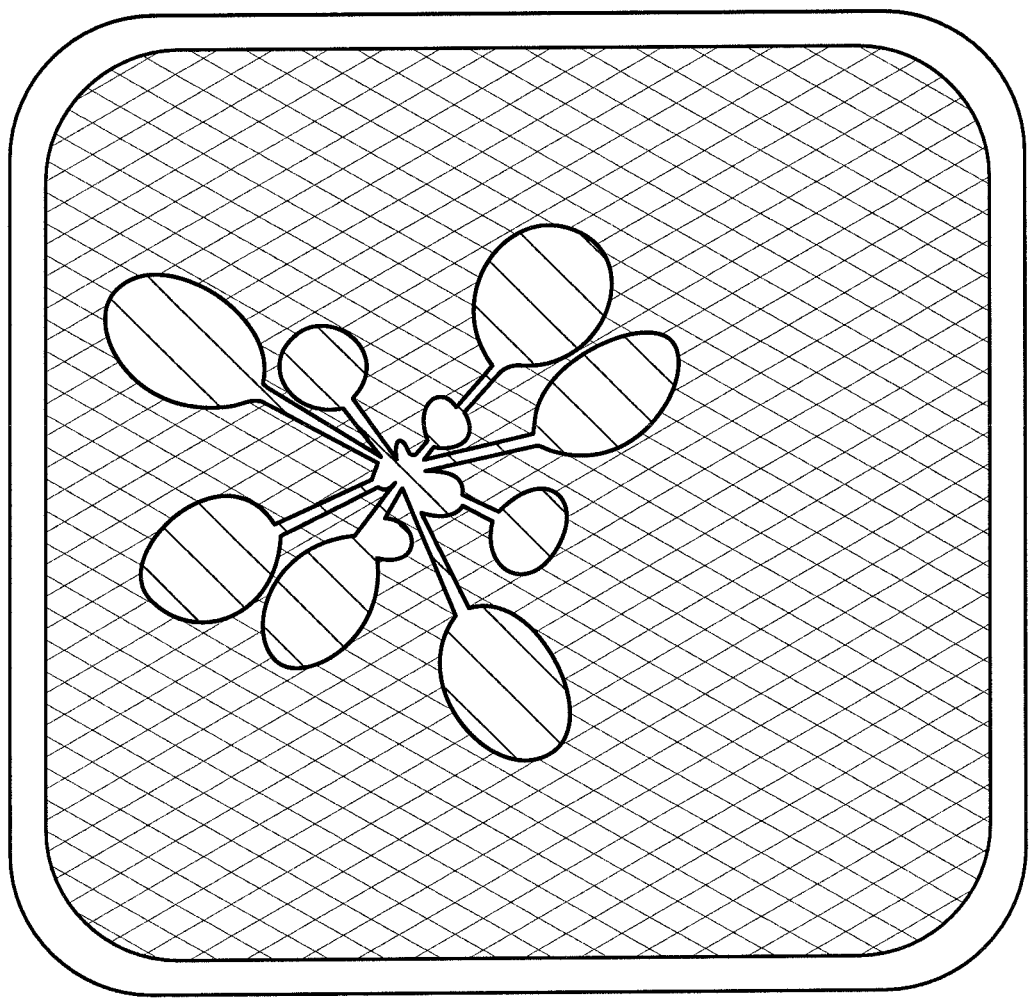
Figure 5H:
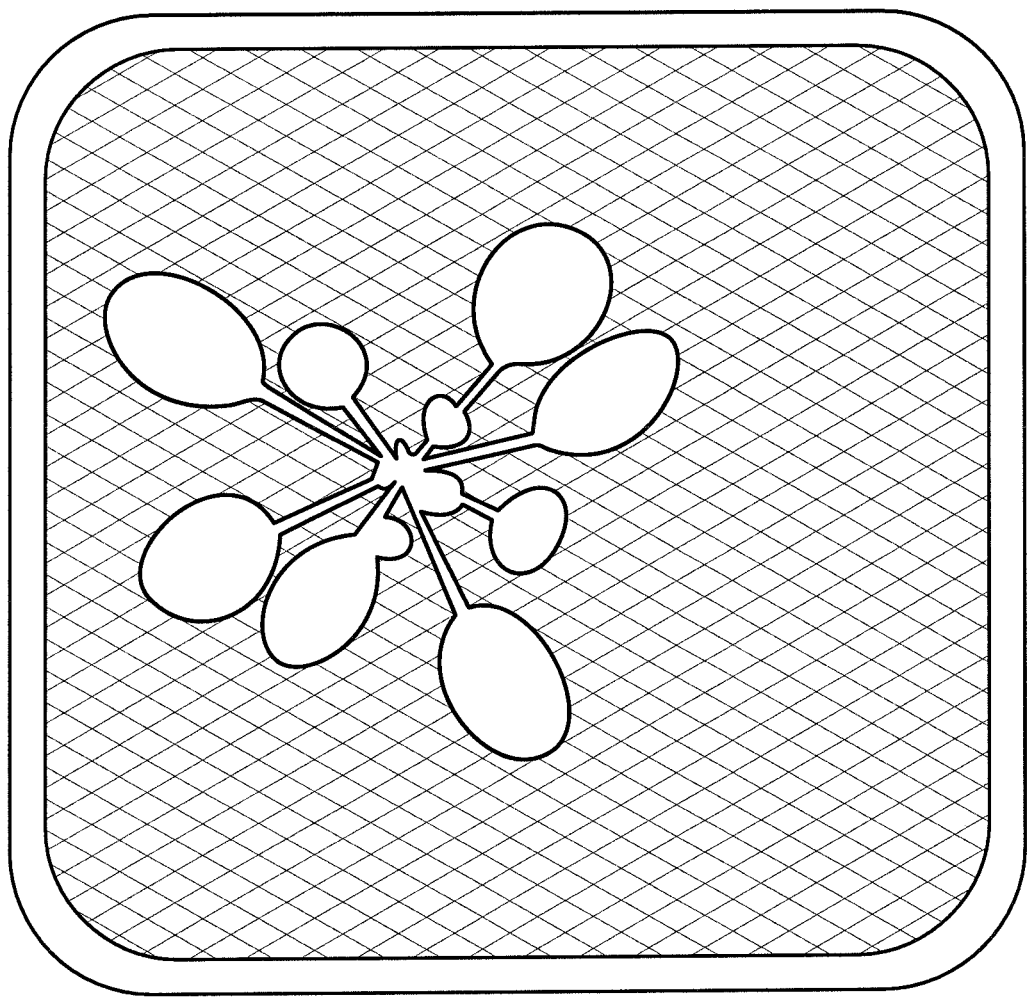
FIG. 5h shows a representation of the result of the separation algorithm.
Figure 5I:
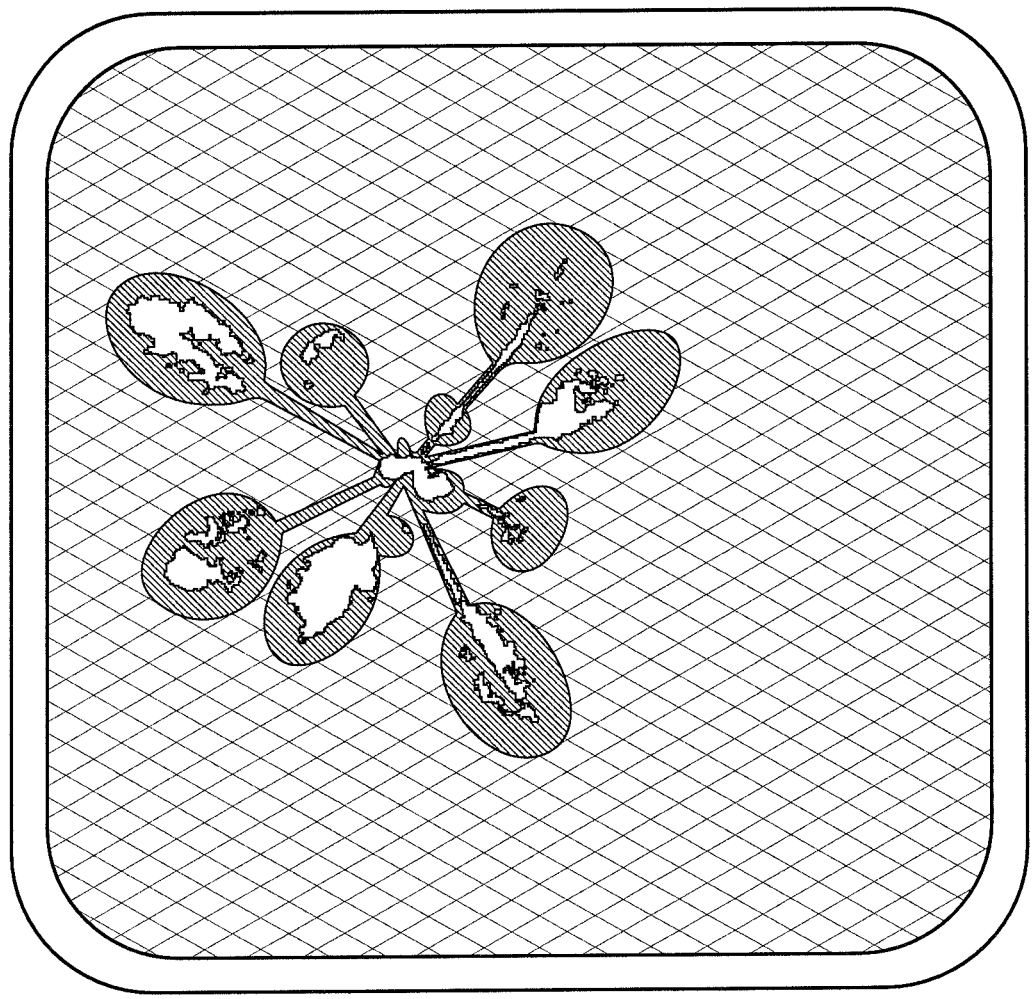
FIG. 5i shows an optical representation of the composite representation with which the segmentation algorithm has been performed in order to obtain FIG. 5h.

FIGS. 5a to 5g show different pictures having increasing exposure times of the same plant. In particular, seven pictures are shown, wherein FIG. 5a is very dark, i.e. relatively underexposed in total, and FIG. 5g is very light, i.e. relatively overexposed in total. FIG. 5i shows an optical, or visual, representation of the composite, or merged, representation as is generated by the selection means e.g. of FIG. 4. One may recognize poor optical quality on the basis of the reduced and/or compressed dynamics. However, said poor optical quality is irrelevant since the merged representation need not be optically displayed, but merely is to be fed into the segmentation algorithm. FIG. 5h shows a representation of the result of the separation algorithm with a clear result of the plant. In addition, on the right one may also see two artifacts which, however, are clearly demarcated and may be readily filtered out. On the basis of the representation of FIG. 5h, which also need not necessarily exist in the illustrated optical form, further calculations and/or determinations of plant features may then be performed.

Even though certain features of the present invention were described above in connection with a device or a method, it shall be noted that the description of device features simultaneously is a description of the functionality in the form of a method and/or as a method step, and that in addition, the description of method steps simultaneously is a description of a device feature, i.e. of a device or a means configured to perform this method step.

Depending on the conditions, the inventive method of analyzing an information signal may be implemented in hardware or in software. Implementation may be performed on a non-transitory storage medium or a digital storage medium, in particular a disk or a CD having electronically readable control signals which may cooperate with a programmable computer system such that the method is performed. Generally, the invention thus also consists in a computer program product having a program code, stored on a machine-readable carrier, for performing the method when the computer program product runs on a computer. In other words, the invention may thus be realized as a computer program having a program code for performing the method when the computer program runs on a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for detecting a plant against a background, comprising:
   a provider that provides a plurality of different photographs of the plant leaf against the background, the photographs differing in that image points of the different photographs which relate to the same location of the plant leaf comprise different levels of brightness;
   a selector that selects such image points, from the different photographs, whose levels of brightness are within a predetermined range, an image point of a first photograph being selected for a first location of the plant leaf, and an image point of a second, different photograph being selected for a different location of the plant leaf so as to acquire a representation of the plant leaf against the background, said representation being a composite photograph and being composed of and/or merged from different photographs; and
   a segmenter that segments the composite photograph so as to acquire a segment representation comprising the plant leaf without the background or the background without the plant leaf; wherein
   at least one of the provider, the selector, and the segmenter comprises a hardware implementation.

2. The device as claimed in claim 1, wherein the selector is configured to select, for each location of the image, a corresponding image point only from one image and to discard the corresponding image points of the other images for the location of the image.

3. The device as claimed in claim 1, wherein the selector is configured to select, for a location of the image, that image point—from the plurality of different photographs—whose brightness is closest to a predetermined brightness.

4. The device as claimed in claim 3, wherein the predetermined brightness is a brightness value which equals half the maximum brightness or which deviates from half the maximum brightness by less than 50% of half the maximum brightness.

5. The device as claimed in claim 1, wherein
   the photographs are color photographs, each image point comprising three color channels, and
   the selector is configured to calculate an average value from the levels of brightness of the three color channels for each image point and to perform said selection on the basis of the average value.

6. The device as claimed in claim 1, wherein
   the pictures are color pictures, each image point comprising three color channels, and
   the selector is configured to select the green color channel and to perform said selection only on the basis of the green color channel and to ignore the other color channels.

7. The device as claimed in claim 1,
   wherein the selector is configured to generate the composite representation as an array of image points originating from the different photographs, or as a list of references to image points in the individual photographs, the list comprising, for each image point, a reference to a photograph of the plurality of photographs, and not comprising any reference to a different photograph of the plurality of photographs.

8. The device as claimed in claim 1,
   wherein the segmenter is configured to perform a discriminant analysis so as to segment the plant leaf from the background.

9. The device as claimed in claim 8, wherein the segmenter is configured to perform color space transformation and binarization while using trainee data sets.

10. The device as claimed in claim 1, further comprising:
    a calculator that calculates plant features from the segmented plant leaf.

11. The device as claimed in claim 10, wherein the calculator is configured to calculate a number of plant leaves, a size of one or more plant leaves, a surface area of one or more plant leaves, a shape of one or more plant leaves, an orientation or an angle of inclination of one or more plant leaves.

12. The device as claimed in claim 1,
    wherein the provider is configured to provide a number of photographs, a dynamic range based on a photograph being equal to a maximum dynamic range divided by the number of photographs, so that N photographs are provided to subdivide the maximum dynamic range into N ranges, each range having provided to it a photograph of its own.

13. The device as claimed in claim 1, wherein the provider comprises a color camera with a controllable exposure time.

14. A method of detecting a plant against a background, comprising:
    providing, by a provider, a plurality of different photographs of the plant leaf against the background, the photographs differing in that image points of the different photographs which relate to the same location of the plant leaf comprise different levels of brightness;
    selecting, by a selector, such image points, from the different photographs, whose levels of brightness are within a predetermined range, an image point of a first photograph being selected for a first location of the plant leaf, and an image point of a second, different photograph being selected for a different location of the plant leaf so as to acquire a representation of the plant leaf against the background, said representation being a composite photograph and being composed of and/or merged from different photographs; and segmenting, by a segmenter, the composite photograph so as to acquire a segment representation comprising the plant leaf without the background or the background without the plant leaf; wherein at least one of the provider, the selector, and the segmenter comprises a hardware implementation.

15. A non-transitory computer readable medium including a computer program comprising a program code for performing the method of detecting a plant leaf as claimed in claim 14, when the computer program runs on a computer or a processor.

\* \* \* \* \*